Dec. 9, 1958  R. MOLL  2,863,423
HYDRAULIC CONTROL INSTALLATIONS FOR MACHINE
TOOLS AND OPERATING MEANS THEREFOR
Filed April 1, 1957  4 Sheets-Sheet 1

INVENTOR
ROBERT MOLL

Dec. 9, 1958 R. MOLL 2,863,423
HYDRAULIC CONTROL INSTALLATIONS FOR MACHINE
TOOLS AND OPERATING MEANS THEREFOR
Filed April 1, 1957 4 Sheets-Sheet 2

Dec. 9, 1958  R. MOLL  2,863,423
HYDRAULIC CONTROL INSTALLATIONS FOR MACHINE
TOOLS AND OPERATING MEANS THEREFOR
Filed April 1, 1957  4 Sheets-Sheet 4

INVENTOR
ROBERT MOLL
By

1

United States Patent Office 2,863,423
Patented Dec. 9, 1958

2,863,423

HYDRAULIC CONTROL INSTALLATIONS FOR MACHINE TOOLS AND OPERATING MEANS THEREFOR

Robert Moll, Geneva, Switzerland, assignor, by mesne assignments, to Societe Anonyme Mipsa, Geneva, Switzerland, a corporation of Switzerland Application April 1, 1957, Serial No. 650,041

Claims priority, application Switzerland April 11, 1956

5 Claims. (Cl. 121—45)

The present invention has for its object a hydraulic control installation, particularly for controlling the advance of a member of a machine tool such as the table of a grinding machine and, comprises generally a source of liquid under pressure and a distributor for controlling the supply of this liquid to a hydraulic motor, said distributor being actuated in such a manner as to ensure an automatic control of the motor in the two directions of operation thereof.

Such installations are already known wherein the automatic distributor can be put out of operation for the purpose of controlling the advance of said member manually. However, this operation is not very rapid, as the operator attending to the machine tool must carry out two distinct operations, that is to say, causing the automatic distributor to be put out of operation and then effecting hand control of the member of the machine tool.

The present invention has as its primary object means to render the aforesaid operation more simple and more rapid. It includes in its organization an installation having an intermediate distributor, located on pipes connecting the automatic distributor to the motor, said intermediate distributor being capable of taking up three different positions; of which one is a neutral position, ensuring the normal connection between the automatic distributor and the motor, and two other positions interrupting the connection between the automatic distributor and the motor, and controlling respectively the motor in its two directions of operation independently of the position of the automatic distributor.

One form of construction of the installation according to the invention is shown diagrammatically and by way of example in the accompanying drawings, wherein.

Figure 2:
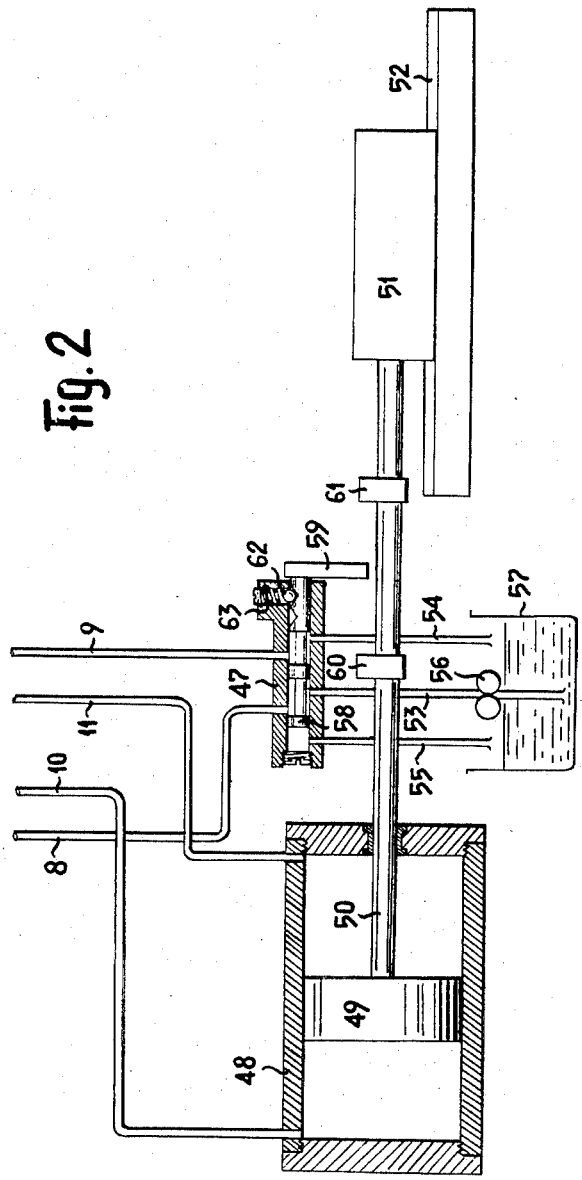
Fig. 2 shows the portion of the installation on which the intermediate distributor acts.

This hydraulic control installation comprises a distributor 1 formed by a tubular body 2 in which a slide 3 is capable of sliding. Said slide 3 has four governing edges 4, 5, 6, 7 for the control of two circuits, of which the first comprises pipes 8 and 9, and the second the pipes 10 and 11, each of said two latter pipes having supply branches 12, 13 respectively. The detail of said circuits is shown in Fig. 2 and is explained hereinafter.

Figure 1:
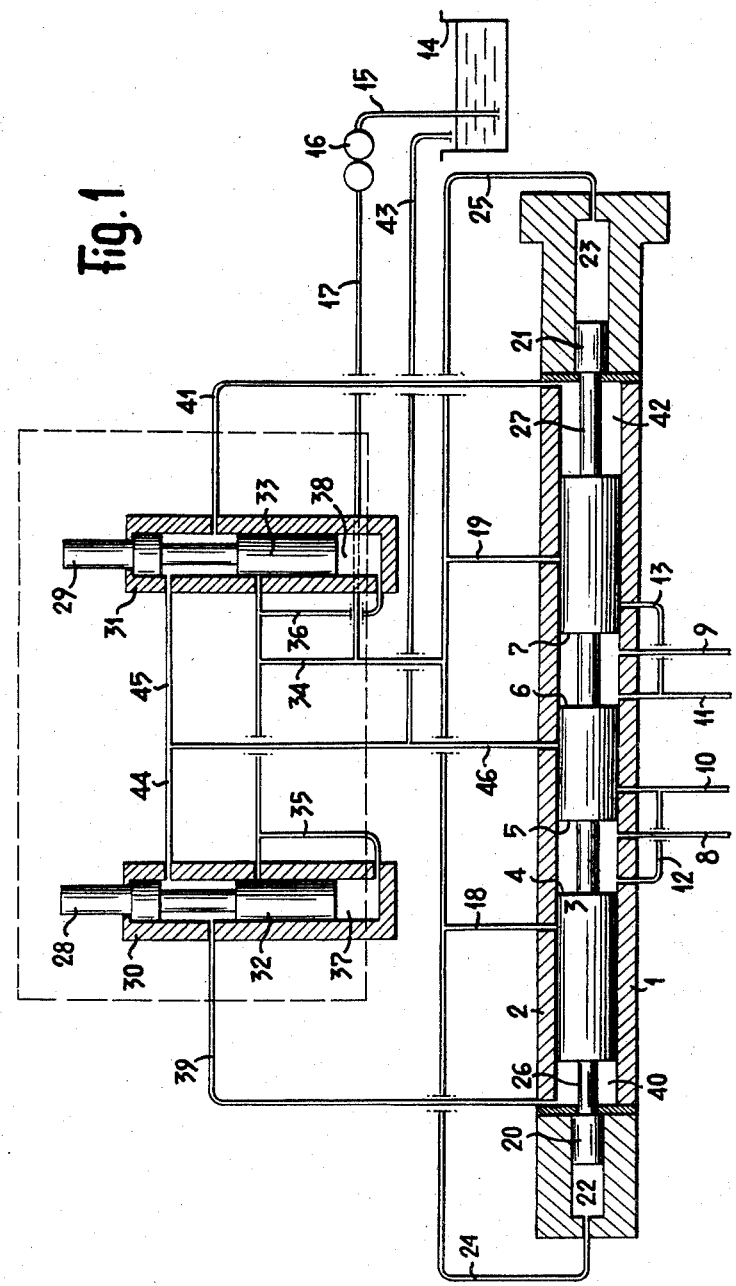
Fig. 1 is a diagram of the intermediate distributor forming part of this installation.

This installation comprises, similar to other known installations, a liquid tank 14, into which dips a feed pipe 15 for a pump 16 which charges the liquid under pressure into a pipe 17 of which two branches 18 and 19 direct this liquid under pressure towards the distributor 1. Said distributor 1 is provided with means for the return of its slide into a neutral position. Said means comprise centering pistons 20, 21 respectively located in such a manner as to be capable of sliding in cylindrical chambers 22, 23, respectively, provided in the ends of the body 2 of the principal distributor. Said chambers 22 and 23 are supplied with liquid under pressure by branch pipes 24, 25 respectively. Each centering pistons 20, 21 respectively, is provided with a rod 26, 27 respectively, adapted to abut against the corresponding end of the slide 3 so as to move this into its central neutral position, as shown in Fig. 1.

The positive control of the slide 3 of the distributor 1 is effected from two operating members 28, 29 respectively, each comprising an auxiliary distributor 30, 31 respectively. Each operating member 28, 29 respectively, constitutes to some extent an extension of the slide 32, 33 respectively of the said auxiliary distributor 30, 31. Said extension projects to the outside of the body of each auxiliary distributor and thus constitutes a pushbutton. A branch 34, coming from the pipe 17, supplies the two auxiliary distributors 30, 31 with liquid under pressure.

Further, for maintaining the push-buttons 28 and 29 in the outer position, supply pipes 35, 36 respectively, supply liquid under pressure into a chamber 37, 38 respectively, provided at one end of the auxiliary distributors 30, 31. A pipe 39 connects the central portion of the distributor 30 to a chamber 40 provided at the left-hand end of the distributor 1. Similarly, a pipe 41 connects the central portion of the auxiliary distributor 31 to a chamber 42 provided at the right-hand end of the distributor 1. A pipe 46 starting at the centre of the distributor 1 is provided for connecting the liquid under pressure to exhaust, this then returning to the reservoir 14 through a pipe 43. Said passage 43 also serves as a collector for two pipes 44 and 45 leading from auxiliary distributors 30, 31 respectively.

The distributor described constitutes an intermediate distributor interposed between a main distributor 47 (Fig. 2) and a hydraulic motor comprising, for example, a cylinder 48 in the interior of which a piston 49 can slide. Said latter is connected by a rod 50 to a table 51 capable of sliding on slides 52. Said table forms part of a machine tool not shown. The pipes 10 and 11 penetrate into the cylinder 48 near to each end thereof and are adapted to permit of the supply of liquid under pressure and the setting to exhaust, respectively, of each of the chambers which are located on each side of the piston 49. The distributor 47 permits of placing the pipes 8 and 9 into communication with a pipe 53 for liquid under pressure and with exhaust pipes 54 and 55, in a known manner. In Fig. 2, for the purpose of facilitating understanding of the drawing, a pump 56 is shown which is adapted to supply under pressure, into the pipe 53, the liquid located in a receptacle 57. Meanwhile, it will be understood that this source of liquid under pressure may be omitted, the pipe 53 being then connected to the pipe 17 of Fig. 1.

The distributor 47 is of known construction and comprises a slide valve 58 of which one end carries a finger 59 adapted to be moved by two stops 60 and 61 secured to the rod 50. Said distributor also comprises a ball 62 subjected to the action of a spring 63 for maintaining the slide in one or other of two positions, by reason of notches provided in said latter.

The operation of the installation shown is as follows: When the intermediate distributor 1 is in the position shown in Fig. 1, the pipes 8 and 10 communicate with one another through the space comprised between the edges 4 and 5 of the slide 3. The pipes 9 and 11 are also in communication through the space comprised between the edges 6 and 7 of the slide. The automatic distributor 47 can therefore control the movements of the piston 49 and of the table 51. With reference to Fig. 2, the fluid under pressure arriving through the pipe 53 penetrates into the pipes 8 and 10, and thus reaches the left face of the piston 49. The space located on the other side of the piston is connected to the exhaust by the pipes 11, 9 and 54. The piston 49 moves towards the right until the stop 60 comes into contact with the finger 59 and moves the slide 58 towards the right. This movement results in causing the pipe 53 for the fluid under pressure, to communicate with the pipes 9 and 11, so that the fluid is now supplied from the right hand side of the piston 49. The chamber located on the other side of said piston is connected to exhaust through the pipes 10, 8 and 55. The piston 49 moves towards the left whilst moving the table 51 until the stop 61 comes into contact with the finger 59 so as to return the slide of the distributor to the position shown in Fig. 2.

When the operator of the machine, of which this installation forms part, applies pressure on the push-button 28, for example (see Fig. 3), liquid under pressure passes through the pipe 39 into the chamber 40 of the distributor 1. As the section of the slide 3 is larger than that of the centering piston 21, the slide 3 moves towards the right whilst pushing the piston 21 rearwards. In this position of the slide 3, the edges 4 and 5 connect to exhaust the pipe 10 through the medium of the pipes 46 and 43, whilst the edges 6 and 7 allow of the supply of liquid under pressure into the pipe 11 from the pipes 17 and 19. In this position of the slide 3, the pipes 8 and 9 are closed by the latter, so that the automatic distributor 47 can no longer have any action on the hydraulic motor. On the contrary, the supply of liquid under pressure into the pipe 11 and the connection to exhaust of the pipe 10 produces a movement of the piston 49 of the hydraulic motor towards the left.

When the operator releases the push-button 28, this returns to its initial position under the action of the pressure acting in the space 37, whereby the chamber 40 is connected to exhaust through the medium of the pipes 39, 44 and 43.

The pressure through pipe 25 acting on the centering piston 21 then pushes said piston and rod 27 towards the left so that said rod abuts slide 3 moving it into its central position shown in Fig. 1.

Figure 3:
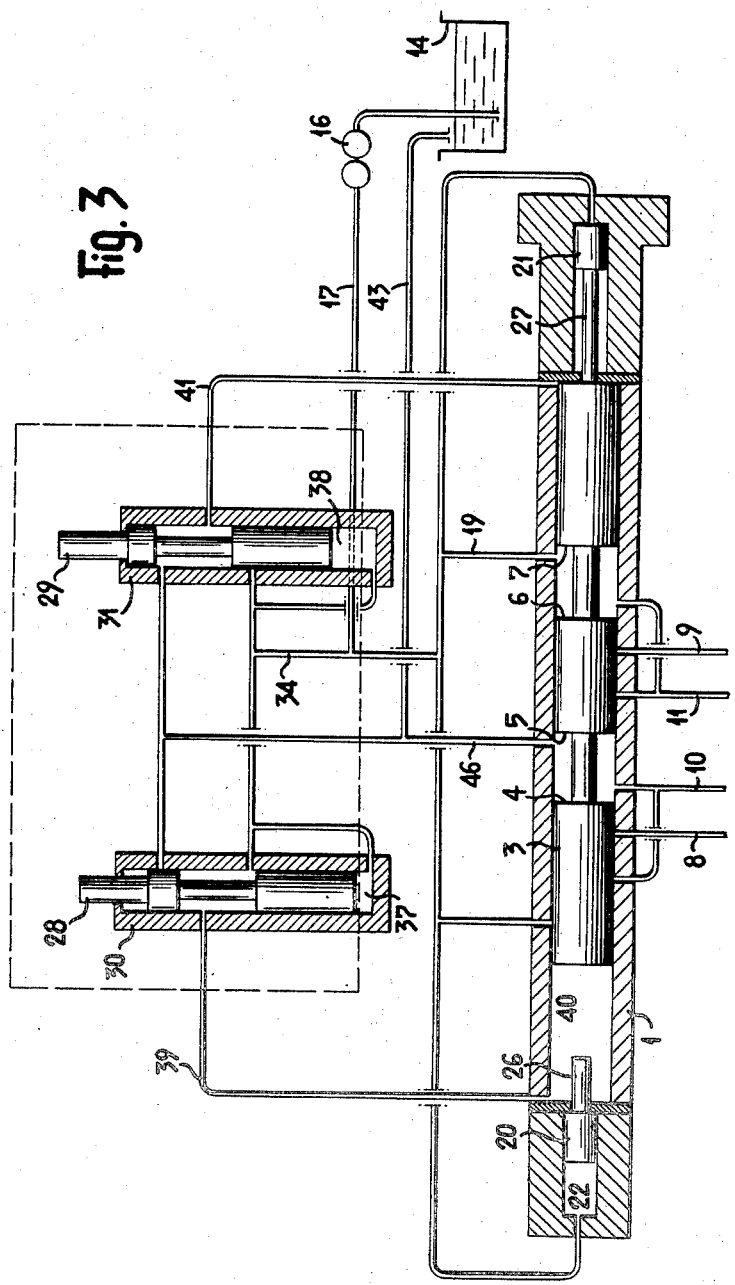
Figs. 3 and 4 show the distributor of Fig. 1 in two different positions of its slide.
Figure 4:
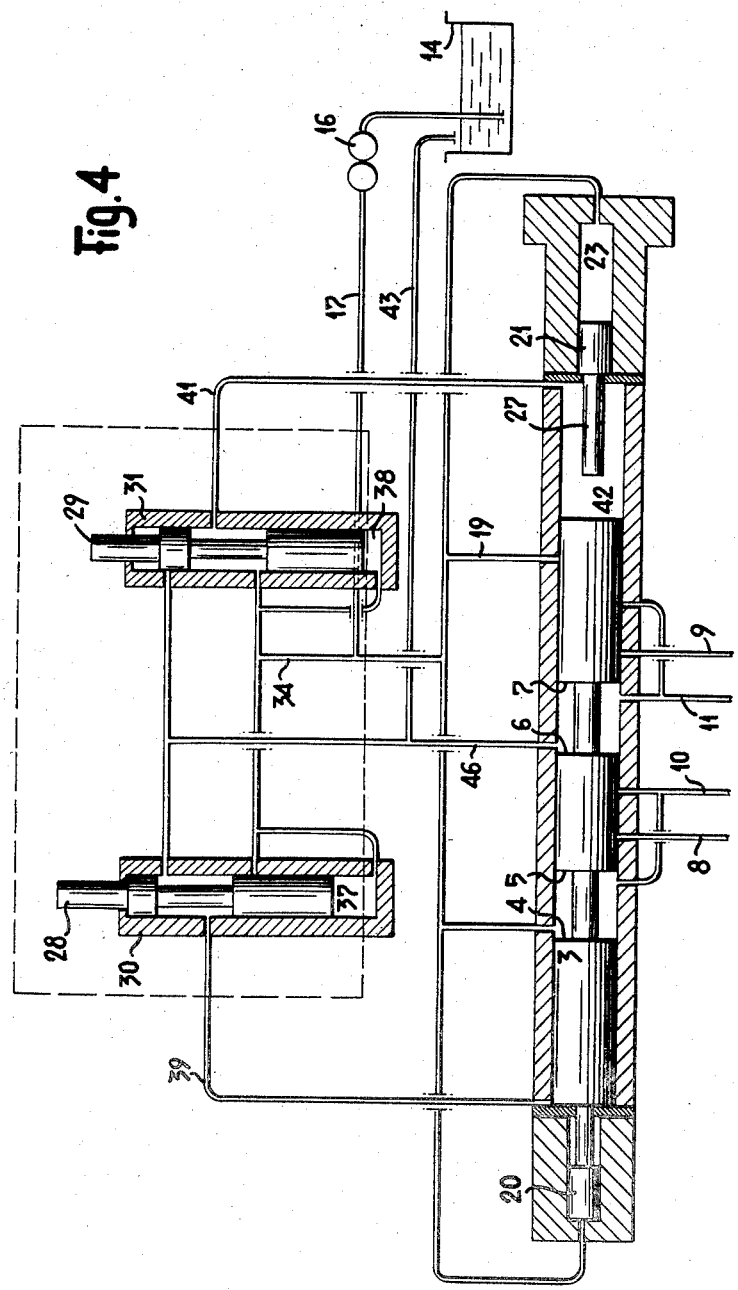

Fig. 4 is a symmetrical view of Fig. 3, showing the movement towards the left of the slide 3 of the intermediate distributor 1, which movement is produced by the operator when he applies pressure on the push-button 29. In this latter case, the governing edges 4 and 5 allow of the supply of liquid under pressure into the pipe 10 from the pipes 17 and 18, whilst the edges 6 and 7 produce the connection to exhaust of the pipe 11 through the medium of the pipes 46 and 43. In the position shown in Fig. 4 as in that shown in Fig. 3, the pipes 8 and 9 are closed by the slide 3. The automatic distributor 47 is again out of service, and the liquid under pressure arriving through the pipe 10 produces a movement of the piston 49 towards the right.

The installation which has been described may as previously mentioned be used with advantage for the control of the movements of the table of a grinding machine, but is not necessarily limited to such use.

By reason of the small size of the auxiliary distributors 30 and 31, a number of operating knobs, such as the knobs 28 and 29 of the various installations of the hydraulic control, of the type of that shown in the drawings, may be grouped on the same control board, placed, for example, on the front face of a machine tool. Such a mounting will permit elimination of the usual control hand-wheel, which necessitates a tedious operation by the operator and is of considerable size.

The principle of hydraulic control by hydraulic relays has the advantage of allowing of the construction of a primary installation by means of pipes of small cross-sectional area and reduced overall size, which allow of a rapid response of the movements controlled by the distributor 1, through the medium of pipes of much larger cross-section.

In a modification of the installation shown in the drawing, the centering pistons 20 and 21, instead of being subjected to hydraulic pressure, may be subjected simply to the action of springs. Further, the pipes 35 and 36 may be omitted, the return of the push-buttons 28 and 29 into their normal position is effected through the medium of springs located in the spaces 37, 38 respectively, of the auxiliary distributors 30, 31.

On the other hand, an installation of the same type as that shown in the drawing may be assumed, in which the distributors 30 and 31 are grouped in a single distributor, controlled by any single operating member, constituted, for example, either by a push-button, capable of occupying three positions, or by a rotary button.

In a modification, it is possible to provide a mechanical control member acting directly on the slide 3 of the intermediate distributor 1, the auxiliary distributors 30 and 31 being then omitted.

I claim:

1. A hydraulic control installation, particularly for controlling the advance of a member of a machine tool, comprising means for the supply of liquid under pressure, an automatic distributor for controlling the supply of said liquid to a hydraulic motor, said distributor being actuated in such a manner as to ensure an automatic control of said motor in the two directions of operation thereof, an intermediate distributor, located on pipes connecting said automatic distributor to said motor, said intermediate distributor being capable of taking up three different positions, one of said positions being a neutral position, ensuring the normal connection between said automatic distributor and said motor, said intermediate distributor being also capable of taking up two other positions interrupting the connection between said automatic distributor and said motor, and also controlling respectively the motor in its two directions of operation independently of the position of said automatic distributor, said automatic distributor controlling two pipes connected to said motor for ensuring the supply of liquid under pressure and the connection to exhaust and inversely, of said latter, said intermediate distributor comprising a slide constituted by three pistons connected together, two spaces being comprised between said three pistons, said spaces forming two chambers limited externally by the body of said distributor, the two pipes coming from the automatic distributor leading into said two chambers when the distributor is in its neutral position, said two pipes then communicating respectively, through said two chambers, with two further pipes leading to said motor, the position of ports in said intermediate distributor, which correspond with said two pipes coming from the automatic distributor, being so located as to be closed by said central piston and by one of the two end pistons respectively when said slide is moved into one or other of its other two positions, said latter positions being located respectively on one side and the other relatively to the neutral position, whereby each of said positions permits placing the pipes leading to the motor under pressure and exhaust respectively.

2. An installation according to claim 1, wherein at least one auxiliary distributor is provided which is actuated by an operating member for passing liquid under pressure into chambers provided at each end of said intermediate distributor and thus controlling the slide of said latter.

3. An installation according to claim 2, wherein said intermediate distributor is provided with means for the return of its slide into the neutral position after a movement has been imparted thereto by the operating member.

4. An installation according to claim 3, wherein said means for the return of the slide comprise centering pistons for said slide located in such a manner as to be capable of sliding in the ends of said body of said intermediate distributor, said pistons being subjected to a hydraulic pressure tending to urge them continuously in the direction of the corresponding end of the slide.

5. An installation according to claim 4, comprising two actuating members, each of said actuating members comprising an auxiliary distributor having a slide which is continuously subjected to a pressure tending to urge it in a determined direction, each slide having an extension which projects to the outside of the body of said corresponding auxiliary distributor and constituting, in the form of a push-button, the respective operating member.

References Cited in the file of this patent
UNITED STATES PATENTS

| | | |
|---|---|---|
| 1,529,218 | Sandwell | Mar. 10, 1925 |
| 2,067,492 | Kingsbury | Jan. 12, 1937 |
| 2,351,263 | Harrington | June 13, 1944 |
| 2,391,629 | Keller | Dec. 25, 1945 |
| 2,422,758 | Temple | June 24, 1947 |